US011429977B2

(12) United States Patent
Elfeky

(10) Patent No.: US 11,429,977 B2
(45) Date of Patent: Aug. 30, 2022

(54) SYSTEM AND METHOD FOR CUSTOMER INITIATED FRAUD MANAGEMENT

(71) Applicant: JPMorgan Chase Bank, N.A., New York, NY (US)

(72) Inventor: Mohamed Ahmed Abdelwahab Elfeky, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 372 days.

(21) Appl. No.: 16/550,435

(22) Filed: Aug. 26, 2019

(65) Prior Publication Data

US 2020/0065809 A1 Feb. 27, 2020

Related U.S. Application Data

(60) Provisional application No. 62/722,225, filed on Aug. 24, 2018.

(51) Int. Cl.
*G06Q 20/40* (2012.01)
*G07F 19/00* (2006.01)
*G06Q 20/34* (2012.01)
*G06Q 20/32* (2012.01)

(52) U.S. Cl.
CPC ....... *G06Q 20/405* (2013.01); *G06Q 20/3265* (2020.05); *G06Q 20/355* (2013.01); *G06Q 20/4016* (2013.01); *G07F 19/206* (2013.01)

(58) Field of Classification Search
None
See application file for complete search history.

(56) References Cited

U.S. PATENT DOCUMENTS

| | | | |
|---|---|---|---|
| 11,037,139 B1* | 6/2021 | Ho | G06Q 20/40975 |
| 11,138,582 B2* | 10/2021 | Dunjic | G06Q 20/204 |
| 2015/0032639 A1* | 1/2015 | Cherifi | G06Q 30/014 |
| | | | 705/303 |
| 2018/0150829 A1* | 5/2018 | Kadam | G06Q 20/20 |
| 2019/0156329 A1* | 5/2019 | Lee | G06Q 20/28 |
| 2020/0019725 A1* | 1/2020 | Rule | G06K 19/0723 |
| 2021/0090078 A1* | 3/2021 | Bozicevich | G06Q 20/4016 |
| 2021/0166260 A1* | 6/2021 | Ho | G06Q 30/0238 |

* cited by examiner

*Primary Examiner* — Neha Patel
*Assistant Examiner* — Nicholas K Phan
(74) *Attorney, Agent, or Firm* — Greenblum & Bernstein, P.L.C.

(57) ABSTRACT

The invention relates to a customer initiated fraud management. With an embodiment of the present invention, customers may control card utilization through a mobile application. For example, customers may restrict the utilization on their cards when they do not need to use their cards as well as allow specific types of transactions on demand (e.g., PoS, Cash, card absent environment transactions, etc.). Also, an interactive user interface provides cardholders the ability to open utilization windows in specific countries and for specific utilization types.

20 Claims, 9 Drawing Sheets

9:33

< Card Controls

Stop All Transactions ☐

Travel                                                          on ⌄
810

Allow transaction in these locations:     | Turkey ▼ |  812 x New York, x Spain, x Italy     814

| 28-JUN-18 | | 06-JUL-18 | |  816

*You will be prompted if any transaction occurs outside your selection.*

███████ni@gmail.com     ☐
                                                                         818
Push notification                                              ✓

Text ███████-2981                                       ✓

In-Store   ✓

Allow any transaction under              $100.00     820
*You will be prompted if any transaction occurs outside your selection.*

ATM   ✓
Allow any transaction under              $120.00     822
*You will be prompted if any transaction occurs outside your selection.*

Online   ✓
Allow any transaction under              $300.00     824
*You will be prompted if any transaction occurs outside your selection.*

[ Save changes ]

Figure 8

SYSTEM AND METHOD FOR CUSTOMER INITIATED FRAUD MANAGEMENT

CROSS REFERENCE TO RELATED APPLICATIONS

The application claims priority to U.S. Provisional Application 62/722,225, filed Aug. 24, 2018, the contents of which are incorporated herein in its entirety.

FIELD OF THE INVENTION

The invention relates generally to fraud management, and more particularly to a system and method for providing customer initiated fraud management.

BACKGROUND OF THE INVENTION

A major issue facing today's card industry is controlling fraud transactions without indiscriminately preventing real transactions from being processed. Across the industry, fraud accounts for billions in losses. It erodes the confidence of cardholders in the transaction processing space and further causes undo hassle for cardholders responding to fraud alerts that may or may not be proper.

Traditionally, issuers take primary responsibility for managing fraud and full liability of fraud losses whereas cardholders have no tool to manage and control spending activities. Most card issuers invest heavily in card fraud management solutions and back office operations to combat fraud and minimize fraud losses. In the traditional fraud management approach, the issuers manage fraud through conventional tools including fraud monitoring, analyses and verification of suspected transactions with cardholders. The current approach requires substantial card issuer investment and manual monitoring or confirmation from cardholders to identify suspect transactions.

These and other drawbacks currently exist.

SUMMARY OF THE INVENTION

According to one embodiment, the invention may apply to various cardholder online channels (that includes but not limited to: Websites and mobile applications). An exemplary illustration may include a mobile application. According to an embodiment of the present invention, a mobile device comprising: a memory component that stores customer data and card control data; an application that executes on the mobile device that accesses a card control application; an interactive display interface that receives customer input and generates display data; and a microprocessor, coupled to the memory component, the display interface and the application, wherein the microprocessor is configured to perform the steps of: generating a set of rules based at least in part on a card control input from a customer, wherein the card control input comprises one or more user defined card restrictions received via the interactive display interface; receiving a signal representative of a current transaction; identifying transaction data from the current transaction; applying the set of rules to the transaction data; and determining whether the transaction is valid based on the set of rules wherein if the transaction is valid, the transaction is approved and wherein if the transaction is not valid, the customer is notified and requested to approve or deny the transaction.

A method of an embodiment of the present invention may be conducted on a specially programmed computer system comprising one or more computer processors, mobile devices, electronic storage devices, and networks. According to an embodiment of the present invention, a method comprises the steps of: generating, via a microprocessor, a set of rules based at least in part on a card control input from a customer, wherein the card control input comprises one or more user defined card restrictions received via the interactive display interface; receiving a signal representative of a current transaction; identifying transaction data from the current transaction; applying the set of rules to the transaction data; and determining whether the transaction is valid based on the set of rules wherein if the transaction is valid, the transaction is approved and wherein if the transaction is not valid, the customer is notified and requested to approve or deny the transaction; wherein the microprocessor is coupled to a memory component, a display interface and a card control application that executes on a mobile device that accesses a card control application.

The computer implemented system, method and medium described herein can provide the advantages of minimizing fraud exposure. The innovative system and method reduce operating costs and provide more efficient fraud and chargeback operations. With the innovative technology, customers are more engaged in preventing fraud and reduces a need to monitor card activity. An embodiment of the present invention shifts a major part of fraud management and controls to the customer side and further minimizes the issuer's operations and investments while providing peace of mind to both customers and issuers. The innovation achieves customer loyalty and retention due to the increased satisfaction of the account holder. The innovative mobile device provides convenience, time efficiencies, and security for customers as they make transactions via various channels.

An embodiment of the present invention may provide card controls (e.g., guardrails, etc.) tailored by cardholders for their particular needs which further involves cardholders in the process. As a result, cardholders may no longer receive unsolicited, confusing and often unwanted messages concerning their account activity thereby improving cardholder experience. In addition, fewer fraud declines will result in fewer calls to Operations Centers. Moreover, tailored cardholder controls and/or guardrails may further reduce fraud exposure while also increasing the likelihood that banks will not decline transactions that cardholders actually authorized.

These and other advantages will be described more fully in the following detailed description.

BRIEF DESCRIPTION OF THE DRAWINGS

In order to facilitate fuller understanding of the present invention, reference is now made to the attached drawings. The drawings should not be construed as limiting the present invention, but are intended only to illustrate different aspects and embodiments of the invention.

FIG. 8 is an exemplary screenshot illustrating a fraud management interface, according to an embodiment of the present invention.

DETAILED DESCRIPTION OF THE PREFERRED EMBODIMENTS(S)

Figure 1:
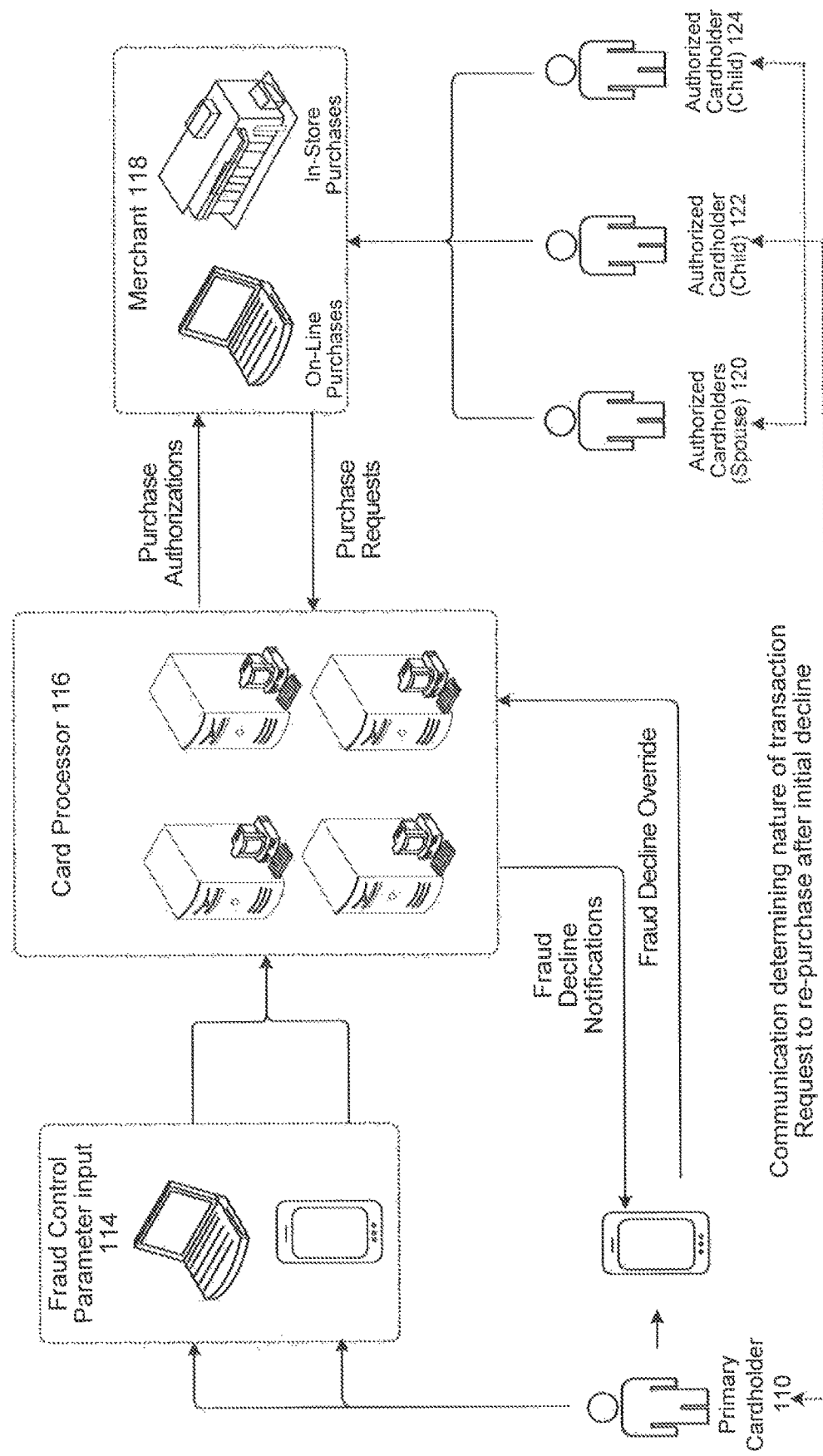
FIG. 1 is a diagram of a system that implements customer initiated fraud and framework, according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to mitigating fraud transactions by implementing fraud strategies that are tailored and customized to a cardholder. With cardholder engagement, an embodiment of the present invention eliminates or minimizes strategies that can be overly broad in some respects and unduly narrow in others.

With an embodiment of the present invention, customers have access to control the utilization of their cards through a mobile application executing on a mobile device. For example, a customer may control and restrict utilization on a card when they do not need to use their cards. In addition, a customer may also monitor, control and/or restrict spend on associated cards (e.g., spouse, child, employee, etc.). Customers may also allow specific types of transactions on demand (e.g., Point of Sale (PoS), cash and card absent environment transactions, etc.). An interactive user interface on a mobile device may provide customers an ability to open utilization windows in specific countries and for specific utilization types. Fraud control may be applied during an authorization phase by using specific data elements within the "0100—authorization message" such as PoS entry mode, transactions identifiers and merchant country codes. Recurring payments may not be impacted and continue to be accepted even if card absent transactions are disallowed. For example, a recurring payment indicator may be an identifier to distinguish this type of transaction. Other customizations and user preferences may be applied.

The embodiments of the present invention achieve various benefits for card issuers and cardholders. For example, fraud losses may be minimized, including e-commerce and card absent environments. With customer controls, the system may restrict card use when cards are lost or stolen. In addition, the system addresses and restricts fraud activities, such as skimming (e.g., especially magnetic stripe transactions), data breach and compromised accounts. Accordingly, an entity may save capital investments in new card fraud management solutions. An embodiment of the present invention may be an alternative of advanced and complex e-commerce security solutions. The system may further reduce operational costs and simplify fraud management activities (e.g., fraud monitoring, fraud chargebacks, etc.).

An exemplary integration may process and define specific data elements from an authorization message (0100) for integration with card management/authorization systems. Various indicators and data elements may be defined in a standard ISO 0100—Authorization Message for associations (e.g., VISA, MasterCard) based on the transaction type. A set of controls may be applied on a mobile interface and other channels by cardholders and may be applied in real time on an authorization level on card management systems. A cardholder may perform various fraud management options, including controlling different transactions, imposing location based controls and time windows, allowing transactions under a specific amount and applying other restrictions.

FIG. 1 is a diagram of a system that implements customer initiated fraud and framework, according to an exemplary embodiment of the invention. An embodiment of the present invention is directed to implementing front end cardholder input controls that set controls and guardrails for transactions that reflect the activity they expect. These controls may be enabled securely online via an interactive interface, such as website, portal and/or mobile app. For example, fraud control parameters may be inputted, as shown by 114. After a primary cardholder inputs one or more guardrails, the guardrails may be stored with a card processor 116. Here, cardholder fraud control parameters may be stored and managed at card processor 116. According to an exemplary embodiment, card processor 116 may represent a Card Issuer.

As transactions are processed should they fall outside the set parameters, an embodiment of the present invention may decline such transactions. For example, an alert may be sent to a primary cardholder 110 (and/or other recipient) indicating that a particular transaction has been declined via fraud decline notifications. The primary cardholder (and/or other recipient) may reply to the alert by acknowledging, confirming, overriding and/or modifying. For example, if the transaction is proper, a fraud decline override may be sent to card processor 116. Other responses may be contemplated by the various embodiments of the present invention. Purchase authorizations and purchase requests may be communicated via Merchant 118. Merchant 118 may represent online purchases, in-store purchases and other types of transactions, Primary Cardholder 110 may authorize other users, such as Spouse 120, Child 122 and Child 124. For example, Cardholder 110 may set an ecommerce limit to $100 while setting a limit of $10 for Child 122 and a limit of $20 for Child 124.

An embodiment of the present invention may be directed to controlling different transactions and utilization types (e.g., in-store, ATM, e-commerce, etc.) based on data elements and identifiers, which may include PoS Entry Mode and MCCs. Merchant category codes (MCC) is a code (e.g., four digit number) that indicates the type of business or service that an entity is in. For example, PoS Entry Mode "01" may represent E-commerce, mail and phone order and other card absent environment transactions, PoS Entry Mode "02, 90, 05, 95 & 91" may represent in store transactions if MCCs are not (6010 or 6011). PoS Entry Mode "02, 90, 05, 95" may represent ATM/Cash Transactions if MCC is either (6010 or 6011). Other identifiers anti codes may be applied.

An embodiment of the present invention may be directed to imposing location based controls and temporary time windows. Data elements and identifiers may include Merchant Country Code to identify the merchant location (Country—Country and State ISO standard codes). This may be used for travel controls and location controlled temporary time windows. The merchant country may be combined with the PoS entry modes and MCCs to provide a transaction type controlled level in a specific country within a specific time range.

For example, a cardholder may allow transactions in Turkey, specifically in store transactions for a predetermined time period, e.g., from Jul. 10, 2018 until Jul. 17, 2018. Transactions with a merchant location in Turkey, PoS entry mode (02, 90, 05, 95 & 91) and MCC is not (6010 or 6011) will be accepted and other transactions (ATM/Cash or E-Commerce) will be declined—even if they were originated in Turkey within the same time range. By the expiration date of the time window, options may be reset to default options.

An embodiment of the present invention may be directed to enabling a cardholder to allow transactions under a specific amount in USD or its equivalent in any other currency within a specific Utilization category. For example, a customer may allow transactions less than or equal to $20.00 for in store only transactions. In this example, transactions with an authorization amount in the 0100 message that are less than or equal to $20.00 will be accepted if the PoS entry mode is (02, 90, 05, 95 & 91) and MCC is not (6010 or 6011).

Other types of transactions with special indicators be applied. Recurring e-commerce transactions (e.g., subscription renewal) may continue to be authorized even if such transactions would be excluded. For example, if the cardholder is subscribing to a content service, the regular e-commerce controls and PoS entry mode and MCCs identifier may be applied. If it is a recurring transaction or a monthly subscription, an additional field may be added to the logic (e.g., recurring indicator) that allows to differentiate between original e-commerce transactions and recurring ones.

An embodiment of the present invention may be directed to reengineering fraud analysis (e.g., alerts and monitoring reports criteria). For example, the cardholder's options and/or preferences from the different channels (e.g., mobile app, website, etc.) may be incorporated and populated to the fraud monitoring reports and alerts generation criteria to facilitate the fraud analysis process and significantly reduce the number of suspected transactions and generated alerts.

For example, a cardholder may open a time window for a specific country and allow a specific type of transactions in this country and within a particular time range. This may include: Poland, Jan. 1, 2017-Jan. 8, 2017, In-store. In this example, in store transactions in Poland within this time range will be excluded from any suspicious activity reports and will be verified by default.

According to another example, if a cardholder made an e-commerce transaction on a suspected website and the time stamp for allowing e-commerce transactions is within 30 minutes of the transaction/authorization time stamp, this may be an indicator that the transaction is genuine and authorized by the cardholder. Accordingly, this transaction may be excluded from the suspected transactions reports and alerts. The system may further send a transaction notification to the cardholder.

An embodiment of the present invention may learn from the customer's behavior and action. In addition, data from similar customers (e.g., similar demographics) may also be analyzed to predict and provide useful card control suggestions. An embodiment of the present invention may provide suggestions or recommendations to the customer based on customer activity. For example, a customer may make travel plans for visit California for a week. An embodiment of the present invention may recognize this activity (through a calendar application, email confirmation, travel website, etc.) and then provide a suggested travel card control. According to another embodiment, the system may automatically include the travel control and then seek customer confirmation. Customer behavior may also include travel history, frequently visited websites, past purchases, etc. An embodiment of the present invention may also consider customer profile data, preferences, etc. Other variations and features may be applied. According to another example, an embodiment of the present invention may recognize that the customer is interacting with a potentially fraudulent merchant (e.g., a merchant with recent fraudulent activity, etc.) and provide a notification or recommendation. Other fraud indicators and assessments may be considered. In addition, historical data may be analyzed to identify patterns that may be used to generate alerts and notifications.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 2:
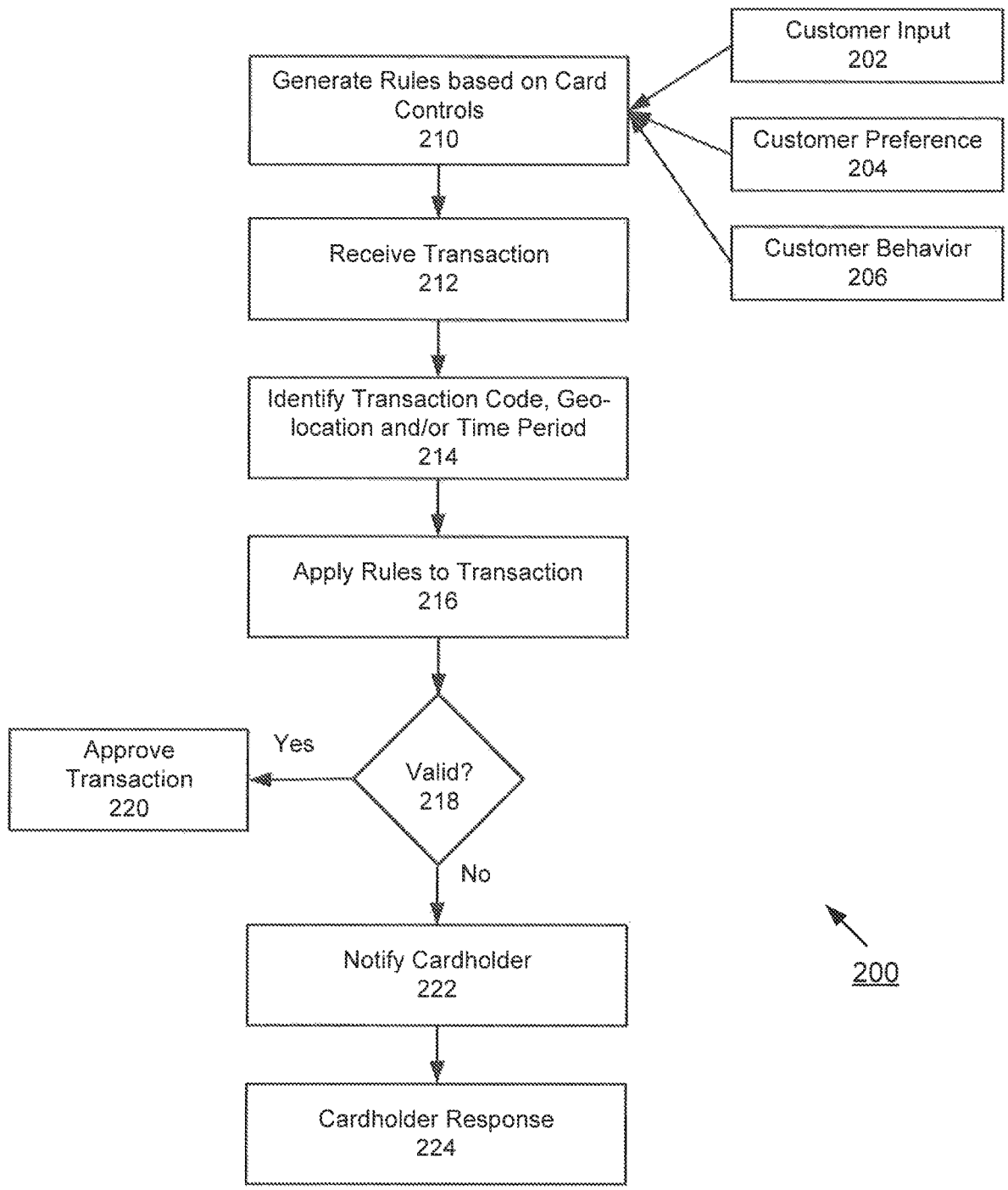
FIG. 2 is an exemplary flowchart for implementing customer initiated fraud management, according to an embodiment of the present invention.

FIG. 2 is an exemplary flowchart for implementing customer initiated fraud management, according to an embodiment of the present invention. At step 210, an embodiment of the present invention may generate rules based on card control inputs. The inputs may be from a Customer Input 202, Customer Preferences 204, and Customer Behavior 206. At step 212, a transaction may be received. At step 214, transaction data may be identified. The transaction data may include a transaction code, geolocation data, time period, etc. At step 216, the rules may be applied to the transaction. At step 218, an embodiment of the present invention may determine if the transaction is a valid transaction. If yes, the transaction may be approved at step 220. If not, the cardholder may be notified at 222. In response to the cardholder being notified, the cardholder may respond via a confirmation, acceptance, override and/or other action at 224. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
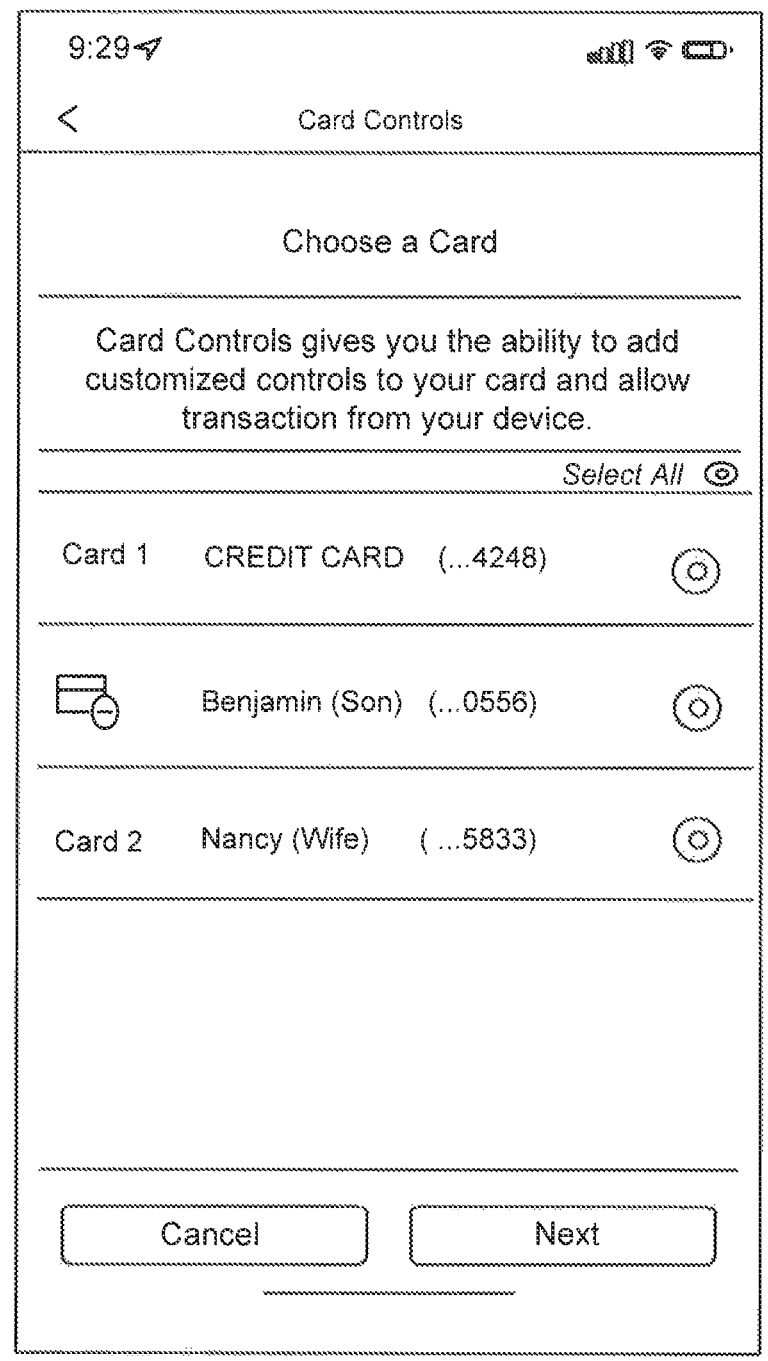
FIG. 3 is an exemplary screenshot illustrating a fraud management interface, according to an embodiment of the present invention.

FIG. 3 is an exemplary screenshot illustrating a fraud management interface, according to an embodiment of the present invention. FIG. 3 is an exemplary interface that enables a user to select a card to apply card controls. Card controls provides the ability to add and/or modify customized controls to a selected card product. For example, after logging in, a cardholder may be presented with certain options that help manage their accounts. As shown in FIG. 3, an option may include Card Controls option that may be selected. For example, cardholder may select which account upon which they would like to set controls. At 310, a cardholder may select a particular card (e.g., credit card, account, etc.) as well as other accounts that are associated with authorized cardholders. An embodiment of the present invention may apply to accounts, debit cards, prepaid cards, stored value instruments, loyalty cards, programs and/or other payment or transaction instrument or mechanism.

Figure 4:
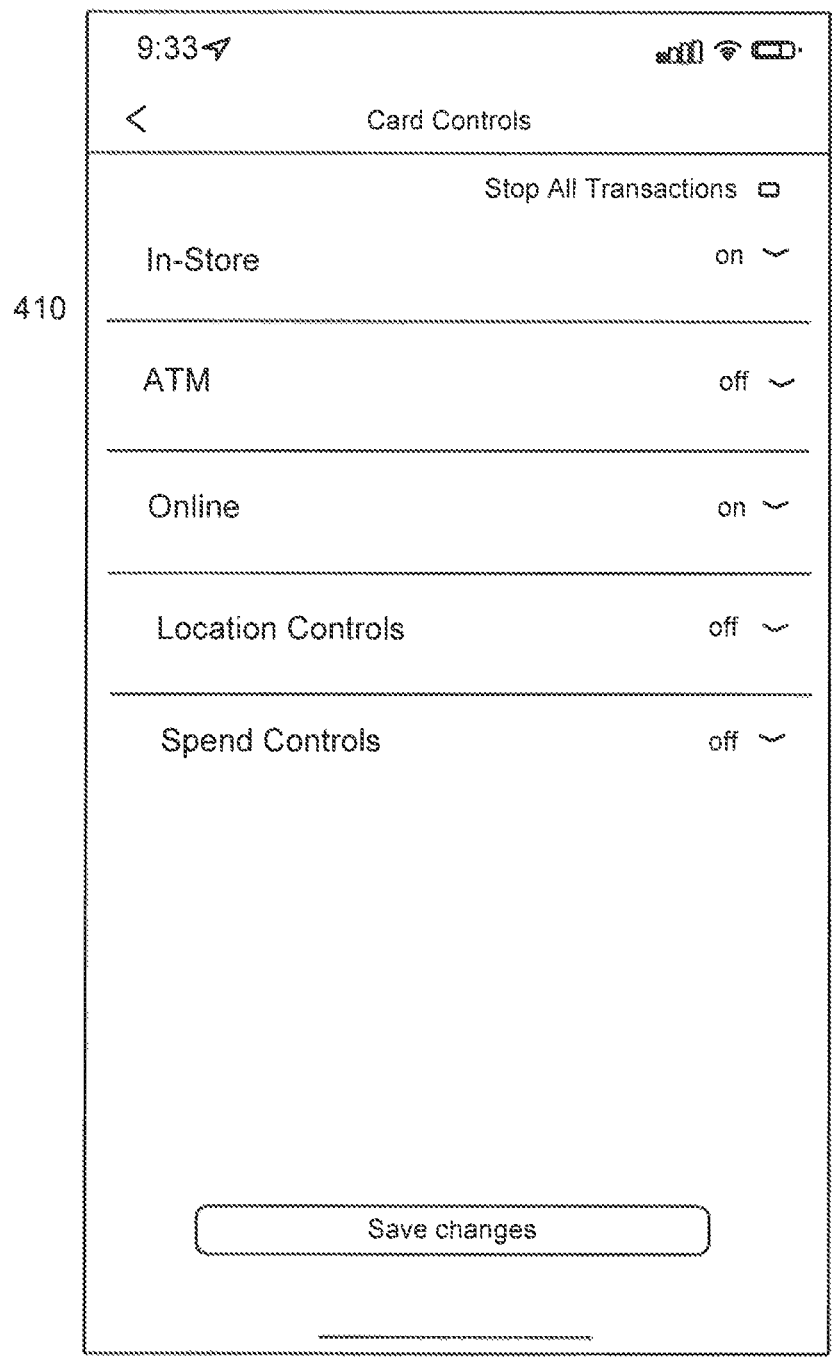
FIG. 4 is an exemplary screenshot illustrating a fraud management interface, according to an embodiment of the present invention.

FIG. 4 is an exemplary screenshot illustrating a fraud management interface, according to an embodiment of the present invention. FIG. 4 is an exemplary interface that enables a user to select a type of card control or activity they can control. As shown by 410, the user may select In-Store, ATM, Online, Location Controls and Spend Controls. Other categories of transactions may be identified and selected. The user may select to apply card controls or not to each category of transactions.

Figure 5:
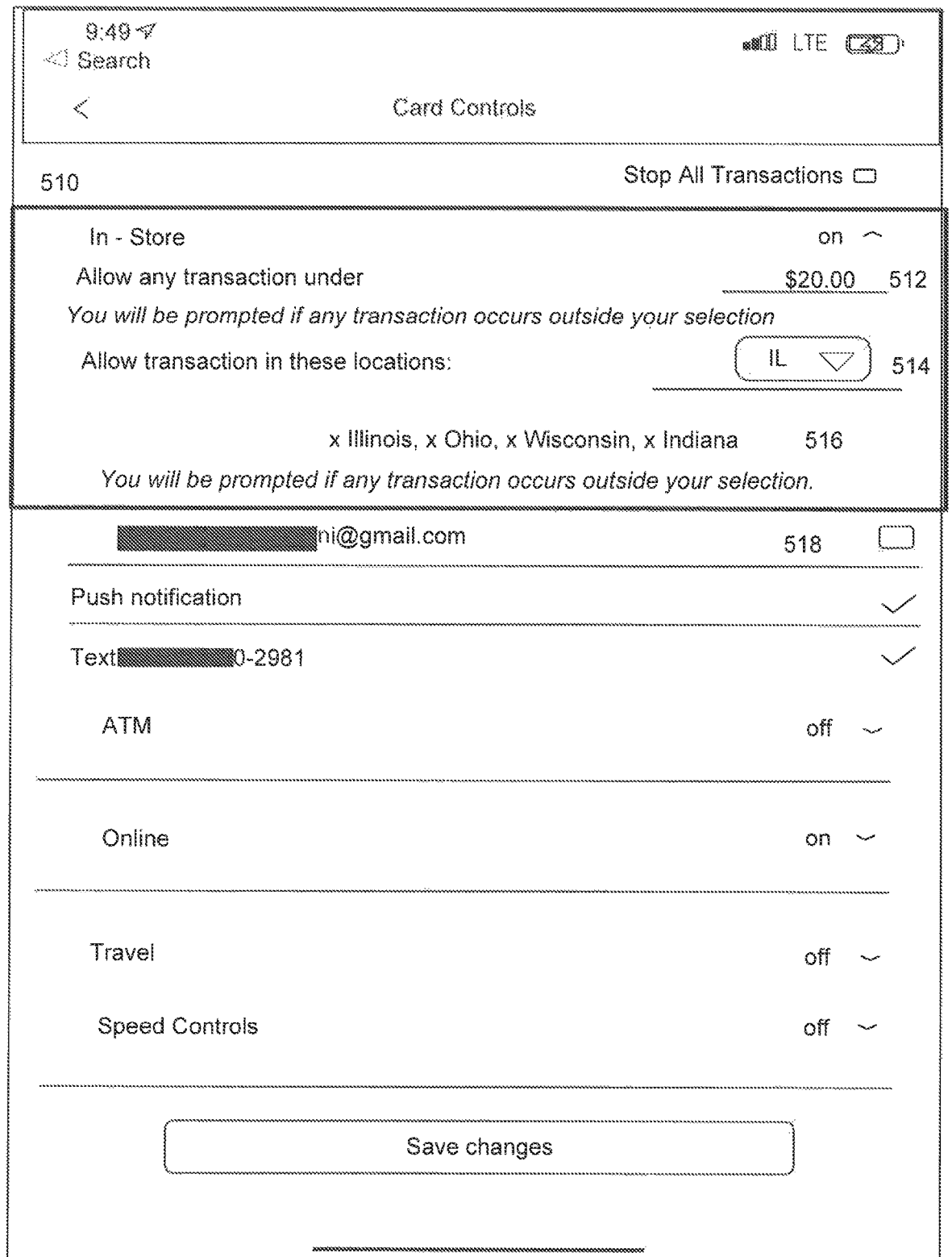
FIG. 5 is an exemplary screenshot illustrating a fraud management interface, according to an embodiment of the present invention.

FIG. 5 is an exemplary screenshot illustrating a fraud management interface, according to an embodiment of the present invention. FIG. 5 is an exemplary interface that details In-Store card controls, as shown by 510. A user may specify, details concerning the In-Store card controls. For example, the user may allow transactions under a dollar amount at 512. Transactions may be allowed in certain areas, at 514. Other authorized locations may be listed at 516. In addition, locations may be identified in other ways, including city, county, user-defined geofence, etc.

In-Store transactions may represent transactions where a physical card is present. As shown in FIG. 5, a cardholder may shut off the ability to use the cards at any In Store location. Also, the cardholder may set limits on the transaction as well as the physical location from which those transactions may be made. Cardholders may set the type of notification they would like whether email, text and/or other form of communication at 518.

Figure 6:
FIG. 6 is an exemplary screenshot illustrating a fraud management interface, according to an embodiment of the present invention.

FIG. 6 is an exemplary screenshot illustrating a fraud management interface, according to an embodiment of the present invention. As shown in FIG. 6, a user may specify details concerning ATM card controls. For example, the user may allow transactions under a dollar amount at 612. Transactions may be allowed in certain areas, at 614. Other authorized locations may be listed at 616. In addition, locations may be identified in other ways, including city, county, user-defined geofence, etc. The user may be alerted as specified at 618.

Figure 7:
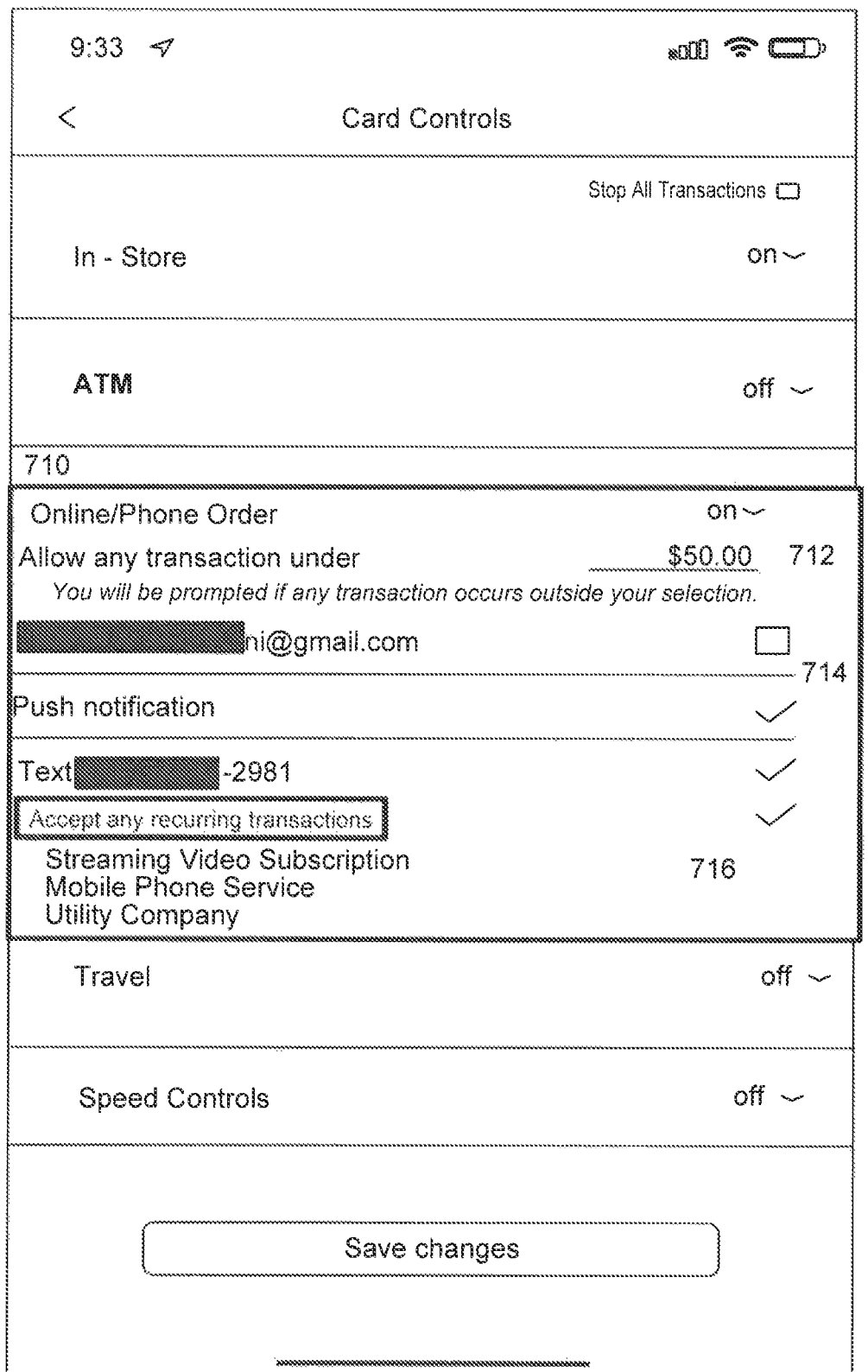
FIG. 7 is an exemplary screenshot illustrating a fraud management interface, according to an embodiment of the present invention.

FIG. 7 is an exemplary screenshot illustrating a fraud management interface, according to an embodiment of the present invention. A user may specify details concerning the online card controls at 710. For example, the user may allow transactions under a dollar amount at 712. The user may be alerted as specified at 714. Recurring transactions may be excluded from card controls at 716. For recurring payments, an embodiment of the present invention may allow limit transactions to specific merchants. Other limits may include dollar amounts, spend thresholds, merchant categories or types, time of purchase, etc. Other exclusions and exceptions may be identified and applied.

Online and Phone Order controls represent transactions where a physical card is not present. Because chip functionality is not relevant in these circumstances, relative fraud exposure is greater here. In addition, location specific controls are not as useful. As such, a cardholder may set a tolerance with which the cardholder is comfortable.

FIG. 8 is an exemplary screenshot illustrating a fraud management interface, according to an embodiment of the present invention. A user may specify details concerning transactions made during travel. A user may specify a location, at 812. In this example, a user may select a country. Locations may be identified in other ways, including city, county, state, user-defined geofence, etc. Other authorized locations may be listed at 814. The user may specify a time period of travel, at 816. An interactive calendar input may be provided. The user may be alerted as specified at 818. The user may control other transactions during travel as well. This may include In-Store transactions at 820, ATM transactions at 822 and Online transactions at 824.

For example, a card control may override controls for situations when a cardholder may be traveling. Here, a cardholder may input the locations they will be visiting as well as certain thresholds that may be applicable.

Figure 9:
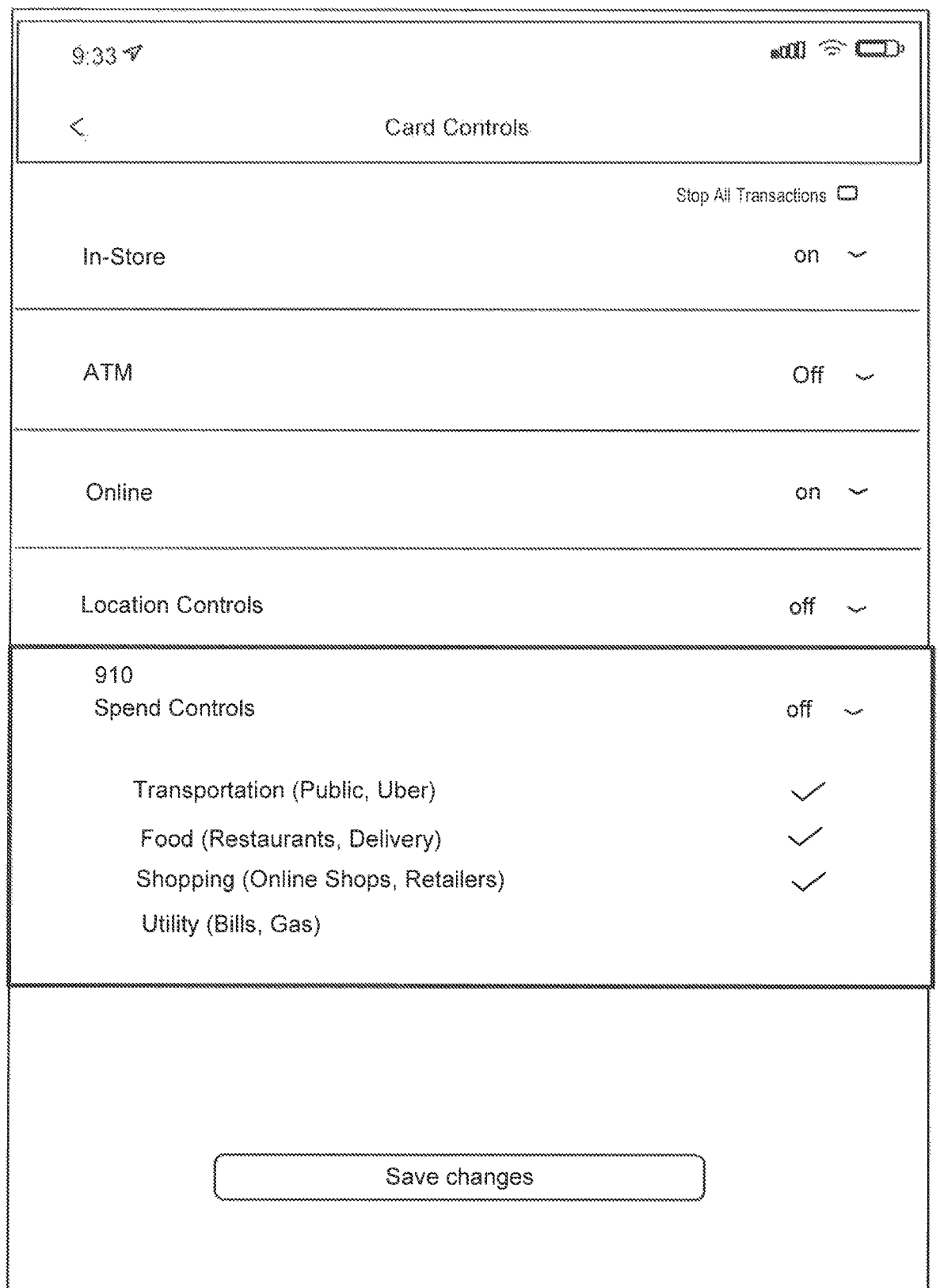
FIG. 9 is an exemplary screenshot illustrating a fraud management interface, according to an embodiment of the present invention.

FIG. 9 is an exemplary screenshot illustrating a fraud management interface, according to an embodiment of the present invention. As shown in FIG. 9, card control may involve types of spend that cardholders may deem allowable at 910. Card controls may be based on Merchant Category Codes (MCCs) and may align with the category that the merchant is assigned when the merchant is added to the network. These controls allow broad types of activity to be excluded should a user know that type of activity would not normally be in their purchase profile.

According to an exemplary embodiment, a cardholder may be out and about with his family and decide to step into coffee shop for a treat. The total for the purchase, however, exceeds the limit that was set. The transaction is declined and a notification is sent via text. Here, the cardholder is presented with actionable options. The cardholder could do nothing and let the decline stand, or the cardholder could allow for an override. In this case, the cardholder understands the reason for the decline and would like to have the payment reauthorized. The reauthorization is sent to the processor. The cardholder may swipe a second time, and the purchase may be completed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art the components of the various embodiments may be arranged at any location or locations within a distributed network without affecting the operation of the respective system.

Data and information maintained by the servers may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, a set of instructions is used in the processing of various embodiments of the invention. FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention, Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A mobile device comprising:
    a memory component that stores customer data and card control data; an application that executes on the mobile device that accesses a card control application; an interactive display interface that receives customer input and generates display data; and
    a microprocessor, coupled to the memory component, the display interface and the application, wherein the microprocessor is configured to perform the steps of:
        receiving, via the interactive display, a set of customer card transaction controls from a customer comprising a plurality of time-based restrictions, location-based restrictions, transaction-type restrictions, type of goods or services restrictions, and amount restrictions,
        generating a set of rules based at least in part on the set of customer card transaction controls from the customer,
        receiving a signal representative of a current transaction;
        identifying transaction data from the transaction including a PoS entry mode, a plurality of transaction identifiers and a merchant country code;
        applying the set of rules to the transaction data;
        determining whether the transaction meets the restrictions set forth under the set of customer card transaction controls;
        allowing the current transaction upon a positive determination that the current transaction meets the restrictions set forth under the set of customer card transaction controls;
        providing, upon a positive determination that the current transaction meets the restrictions set forth under the set of customer card transaction controls, a customer alert comprising a fraud decline of the attempted current transaction; and
        receiving, in response to the customer alert, a reply confirming or overriding the fraud decline.

2. The device of claim 1, wherein the transaction data comprises a transaction code, a geo-location and a time period associated with the transaction.

3. The device of claim 1, wherein the card control input comprises a selection of one or more customer accounts.

4. The device of claim 1, wherein the one or more user defined card restrictions comprise In-Store controls.

5. The device of claim 4, wherein the In-Store controls comprise an amount threshold and a location restriction.

6. The device of claim 1, wherein the one or more user defined card restrictions comprise ATM controls.

7. The device of claim 6, wherein the ATM controls comprise an amount threshold and a location restriction.

8. The device of claim 1, wherein the one or more user defined card restrictions comprise Online controls.

9. The device of claim 8, wherein the Online controls comprise an amount threshold and one or more recurring transaction exceptions.

10. The device of claim 1, wherein the customer identifies one or more modes of communication for notification.

11. A method comprising the steps of:
receiving, via an interactive display connected to a microprocessor, a set of customer card transaction controls from a customer comprising a plurality of time-based restrictions, location-based restrictions, transaction-type restrictions, type of goods or services restrictions, and amount restrictions,
generating; via a microprocessor, a set of rules based at least in part on the set of customer card transaction controls from the customer,
receiving a signal representative of a current transaction;
identifying transaction data from the current transaction including a PoS entry mode, a plurality of transaction identifiers and a merchant country code;
applying the set of rules to the transaction data;
determining whether the transaction meets the restrictions set forth under the set of customer card transaction controls;
allowing the current transaction upon a positive determination that the current transaction meets the restrictions set forth under the set of customer card transaction controls;
providing, upon a positive determination that the current transaction meets the restrictions set forth under the set of customer card transaction controls, a customer alert comprising a fraud decline of the attempted current transaction;
receiving, in response to the customer alert; a reply confirming or overriding the fraud decline; and
wherein the microprocessor is coupled to a memory component, a display interface and a card control application that executes on a mobile device that accesses a card control application.

12. The method of claim 11, wherein the transaction data comprises a transaction code, a geo-location and a time period associated with the transaction.

13. The method of claim 11, wherein the card control input comprises a selection of one or more customer accounts.

14. The method of claim 11, wherein the one or more user defined card restrictions comprise In-Store controls.

15. The method of claim 14, wherein the In-Store controls comprise an amount threshold and a location restriction.

16. The method of claim 11, wherein the one or more user defined card restrictions comprise ATM controls.

17. The method of claim 16, wherein the ATM controls comprise an amount threshold and a location restriction.

18. The method of claim 11, wherein the one or more user defined card restrictions comprise Online controls.

19. The method of claim 18, wherein the Online controls comprise an amount threshold and one or more recurring transaction exceptions.

20. The method of claim 11, wherein the customer identifies one or more modes of communication for notification.

* * * * *